United States Patent Office 3,521,857
Patented July 28, 1970

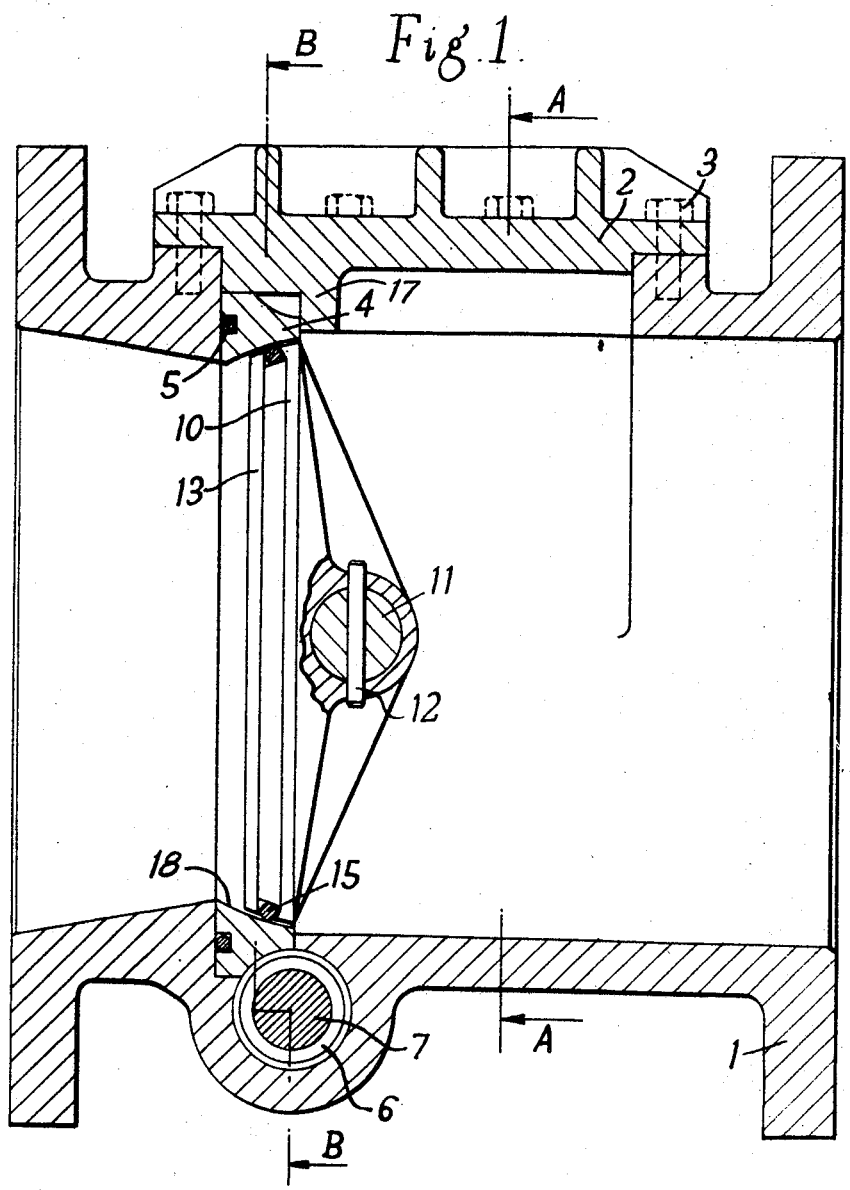

3,521,857
BUTTERFLY VALVES
Charles Edward Over, Betchwood, England, assignor to Kinematics Limited, London, England
Filed June 30, 1967, Ser. No. 650,385
Claims priority, application Great Britain, July 4, 1966, 29,984
Int. Cl. F16k 1/20, 25/00, 31/53
U.S. Cl. 251—305                                            8 Claims

ABSTRACT OF THE DISCLOSURE

A butterfly valve having a valve body, the centre part of which is of U-shape in cross-section and has a top opening. A seat ring is slidable in a U-shaped groove in the sides and body of the centre body part for removal through the top opening. A valve disk, disengageably mounted on an offset spindle, is also removable through the top opening after withdrawal of the spindle. The seat-ring may be rotatable either by manually-operated driving means or by ratchet gearing or the like driven by the valve disc spindle.

---

Figure 3:
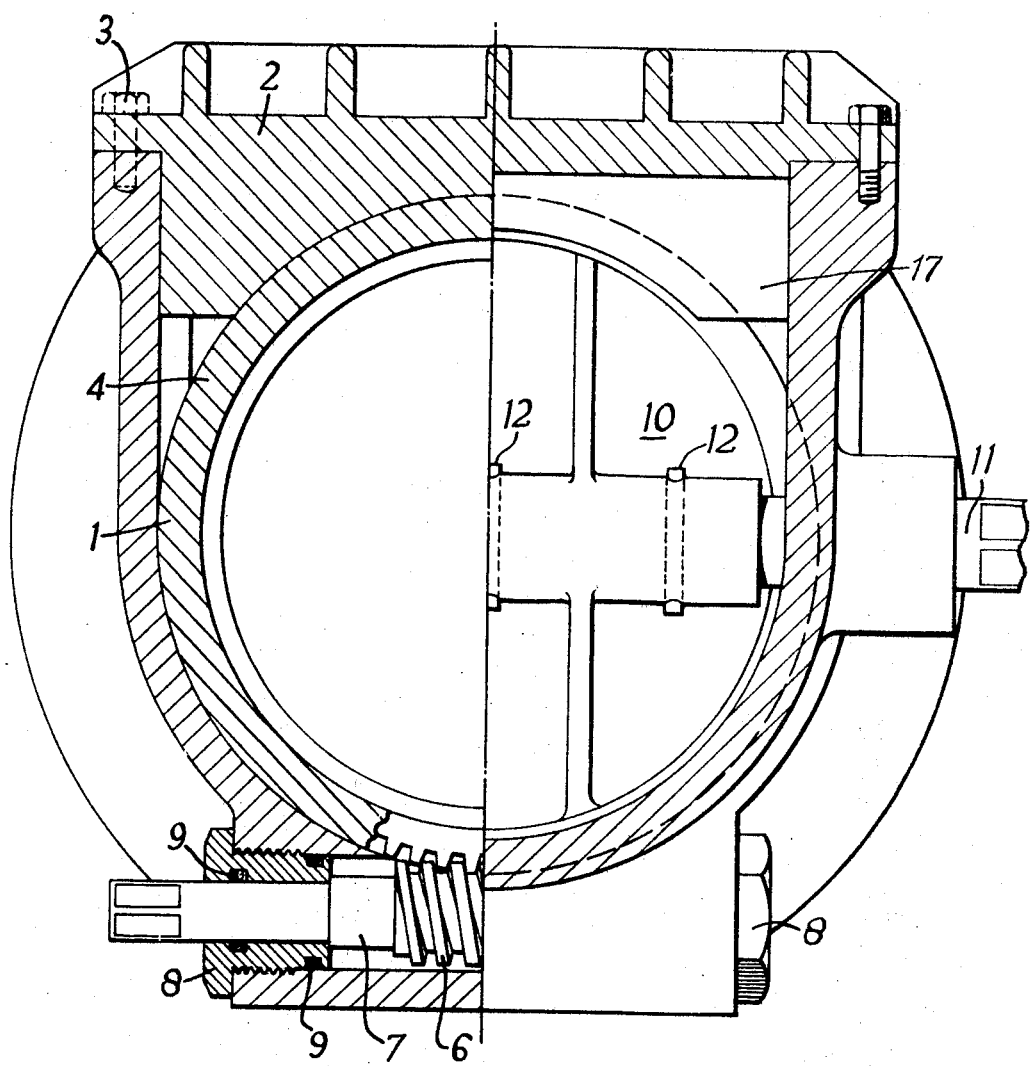

This invention relates to improvements in butterfly valves.

In order to permit the removal and replacement of the valve disc or the seat ring of a butterfly valve, it has hitherto been necessary first of all to remove the valve body from the pipe line. The seat ring is then withdrawn through the open end of the bore of the body and, after the spindle on which the disc is mounted has been withdrawn, the disc is likewise removed through the open end of the bore of the body. If the valve is of large size, the removal of the valve body from the pipe line may involve considerable labour. Moreover, it is frequently difficult to prevent springing of the pipe line on removal of a valve body, which in turn may result in distortion of other parts of the pipe line and consequently increased difficulty in re-inserting the valve body into the pipe line after renewal of the seat ring, the valve disc or the peripheral sealing ring on the valve disc.

It is accordingly an object of this invention to provide an improved butterfly valve in which the seat-ring and the valve disc can be renewed or replaced without removing the valve body from the pipe line.

With this object in view, the improved butterfly valve according to the present invention comprises a valve body including a central body portion in the form of a channel of substantially U-shaped cross-section having a top opening and tubular inlet and outlet connections opening into the ends of said channel, a seat ring located in a working position in the lower part of said channel adjacent the outlet connection and arranged so as to be removable from said working position through said top opening, a cover detachably secured over the top opening of the central body portion, retaining means located beneath said cover for holding the seat ring in its working position while the cover is secured, a spindle journaled in bearings in the side walls of the central body portion and located so that its central axis intersects the centre-line of the curved lower part of the channel of said central body portion and lies in a plane parallel to, and offset in the direction towards the inlet connection from, the plane of the seat ring and a valve disc detachably mounted on said spindle in offset relation thereto and rotatable with said spindle between a valve-closing position in which its periphery is sealed with respect to the seating ring and a valve-opening position in which its periphery is removed from the seating ring.

The seat ring may be slidably engaged in a U-shaped groove formed in the interior wall surface of the central body portion adjacent the outlet connection, in which case the retaining means may consist of a saddle plate projecting downwardly from the underside of the cover, having its lateral edge portions slidably engaged in the upper parts of the two upright limbs of the U-shaped groove and engaging over the upper peripheral portion of the seat ring.

It has been found that the passage of fluid through a butterfly valve can have an abrasive effect on the sealing surface of the seat ring or the speed of flow may be sufficiently high to cause cavitation of or erosion damage to the said sealing surface. When a butterfly valve is just opening or just closing, the apertures available for the flow of fluid through it are crescent-shaped openings at two locations on the sealing surface of the seat ring positioned 180° apart and situated on a line normal to the axes of the valve spindle. Since, at the moments of opening and closing, there is liable to be a high rate of flow of fluid through these crescent-shaped openings, erosion of the sealing surface of the seat ring tends to be concentrated at the two corresponding parts thereof.

In order to obviate this disadvantage by enabling any wear to be evenly distributed around the sealing surface of the seat ring, in a preferred form of the butterfly valve according to this invention, the seat ring is rotatable in its working position and has a ring of gear teeth on its periphery meshing with a driving gear on a shaft rotatably supported by the valve body.

The shaft of the driving gear meshing with the gear teeth on the seat ring may be manually rotatable, in which case it is preferably turned slightly in a given direction each time the valve is opened or closed or after a number of opening and closing operations, in order to present different parts of the sealing surface thereof to the positions of maximum abrasive flow.

Alternatively, the said shaft may be drivably connected to the valve disc spindle by a one-way transmission, such as a ratchet gear, whereby the seat ring is rotated through a small angle in a given direction during each cycle comprising a rotary movement of the valve disc towards the valve-opening position and a rotary return movement thereof towards the valve-closing positions.

Preferably, the seat ring has a sealing surface of part-spherical shape having its centre coincident with the point of intersection of the axis of the valve disc spindle and the centre line of the curved lower part of the channel of the central body portion and the valve disc has a resilient sealing ring fitted around its periphery and arranged to cooperate with said sealing surface in the valve-closing position of the valve disc. The seat ring may, if desired, have adjoining annular surface parts of frusto-conical shape on one or both sides of the part-spherical sealing surface so as to form a venturi-shaped orifice.

Figure 4:
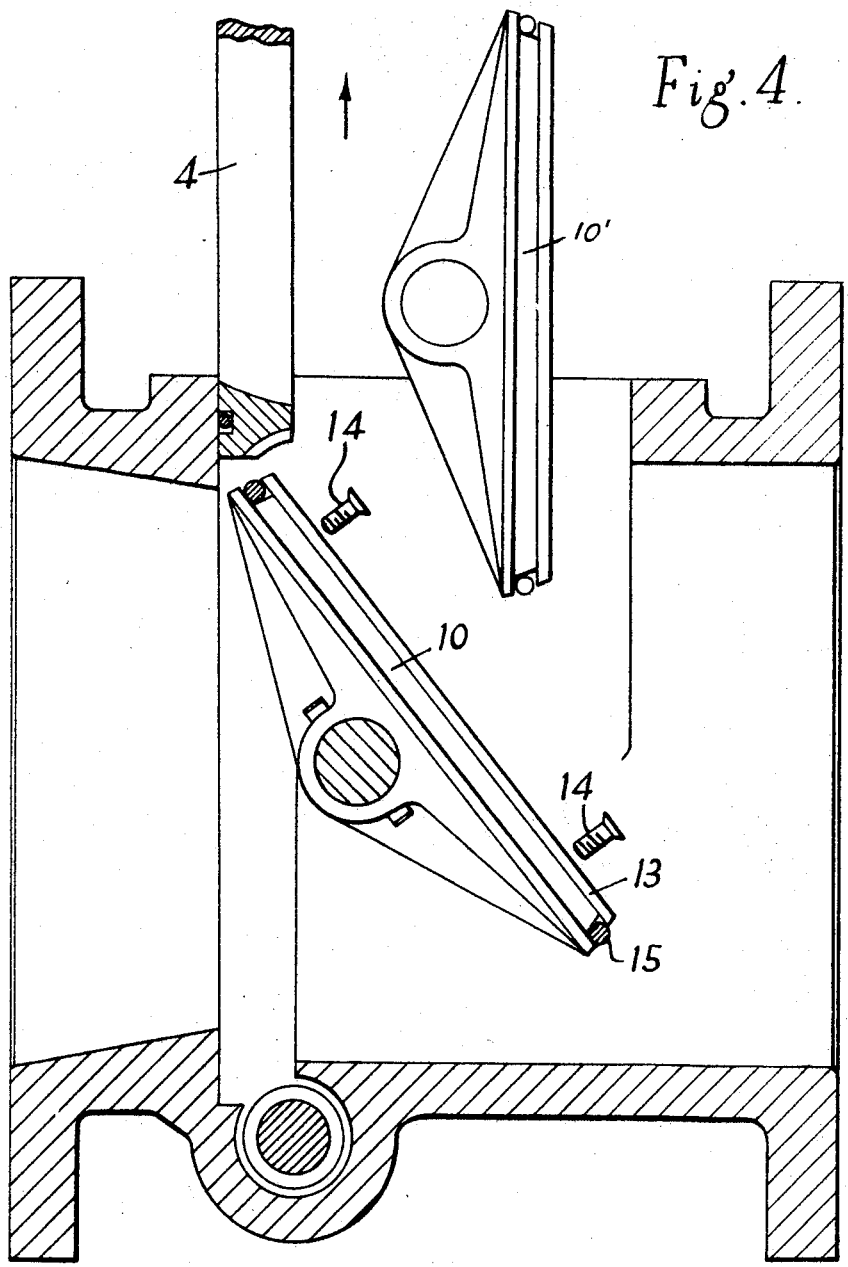

An exmaple of a butterfly valve according to the present invention is shown in the accompanying drawings, in which:

FIG. 1 is a section through an assembled valve taken on a plane continuing the axis of the cylindrical parts of the valve body and at right angles to the axis of the valve disc spindle, the valve being shown in its closed position, FIG. 2 is a scrap view in part section of a peripheral part of the valve disc showing the arrangement of sealing means on the valve disc, FIG. 3 is a two-part sectional view through the valve taken in planes normal to the longitudinal axis of the cylindrical parts of the valve body. The righthand half of this figure is a section on the line A—A in FIG. 1 and the lefthand half is a section on the line B—B in FIG. 1, and FIG. 4 shows the same section as FIG. 1 with a cover removed. The valve seat is shown in the partially removed position and the valve disc is shown turned to a position suitable for removing the junk ring and renewing the peripheral seal through the inspection aperture. FIG. 4 also includes an elevational view of the valve disc in a position which it assumes subsequently during its removal through an inspection aperture after its spindle has been withdrawn.

The arrows associated with the section lines A—A and B—B in FIG. 1 point in the downstream direction.

Referring to FIG. 1, the valve body 1 consists of a central U-shaped or channel-shaped body portion with cylindrical flanged inlet and outlet connections. The U-shaped body is fitted with an inspection cover 2, which is secured to it by studs and nuts 3.

Fitting, with a working clearance, into a groove in the valve body near the outlet end of the body 1, is a circular seat ring 4. This seat ring 4 fits into the curved part of the groove below a plane containing the longitudinal axis of the valve body and the axis of the valve disc spindle. The upper parts of the two straight limbs of the groove between the last-mentioned plane and the cover 2 serve for the reception of edge parts of a saddle-shaped projection 17 integral with the cover 2. As can be seen from the righthand section of FIG. 3, this saddle-shaped projection functions as a retaining means and enshrouds the seat ring 4 for a sufficient distance in from the cover 2 towards the axis of the valve body to ensure reliable retention of, and a good bearing surface for, the seat ring 4. The seat ring 4 is held sufficiently securely for it to retain its position with its diametrical centre coincident with the longitudinal axis of the valve body, while at the same time being able to rotate about its axis. An O ring seal 5, is fitted into an annular groove in the downstream face of the seat ring 4. Teeth are cut on the periphery of the seat ring, which mesh with a worm 6 having a shaft 7 carried in bearings 8, 8 situated in a cylindrical housing integral with the valve body. Leakage of fluid out of this housing is prevented by O ring seals 9—9 fitted at both ends of the shaft. The shaft 7 may be rotated manually to vary the position of the seat ring seating surface or the said shaft 7 may be linked by ratchet gearing or other known linkages to the movement of the main disc as it opens and shuts so that the seat is rotated slightly at each operation.

The sealing surface 18 of the seat ring 4 is a segment of a sphere, the radius and centre of which will be described below. The valve disc 10 is circular and is fixed to a spindle 11, the axis of which passes through the longitudinal axis of the cylindrical sections of the valve body and also lies in a plane normal to the said axis. The axis of the spindle 11 is also parallel to the sealing plane of the cover 2. The spindle 11 is situated slightly upstream of the upstream end face of the seat ring 4 so that there is just sufficient clearance for the part of the valve disc 10 which embraces the spindle 11 not to foul the seat ring 4 when the valve disc 10 rotates through 360°. The valve disc 10 is secured to the spindle 11 by dowel pins 12, 12. The spindle 11 is rotatable in bearings (not shown) in the body. The periphery of the valve disc 10 is situated within the axial width of the seat ring 4 and the said periphery is formed as part of the surface of a sphere having the same centre as the spherical surface 18 of the seat ring 4. The centre of these two spherical surfaces is located at the intersection of the axis of the spindle 11 and the longitudinal axis of the cylindrical portions of the valve body 1. The radii of the said two spherical surfaces differ only by the working clearance required between the two surfaces. Thus, the valve disc 10 is able to rotate through 360° without any metallic contact with the valve seat 4, while at the same time a very small clearance between the two surfaces can exist.

On the periphery of the valve disc 10 are formed the upstream edge and the bottom of an annular groove. The upstream edge of this groove is inclined radially outward and towards the downstream side of the valve disc when the latter is in its closed position. The bottom of the groove is part of a spherical surface having the same centre as the abovementioned spherical surfaces. A junk ring 13 is attached to the downstream side of the valve disc 10 by a ring of screws 14. The edge of the junk ring 13, which forms the downstream edge of the seat groove, is inclined radially outward and towards the upstream side of the valve disc, so that this groove has a dovetailed section. The main seal 15 is a circular-section O ring which is retained in the groove by the dovetail from of the latter. An annular groove formed in the downstream face of the valve disc 10 is fitted with an O ring seal 16 to prevent fluid leakage between the mating faces of the junk ring 13 and the valve disc 10.

The junk ring 13 is formed with a ring of small pressure-relief holes 19 communicating with the bottom of the main seal groove. The purpose of these holes is to prevent the build-up of pressure in the groove behind the main seal ring 15 at the moment of closing of the valve, such pressure tending to force the seal 15 out of its groove, which could lead to damage of the ring between the seat and the disc. These pressure-relief holes 19 are shown in the scrap sectional view of FIG. 2.

FIG. 4 shows the valve disc 10, inclined at a suitable angle for removal of the securing screws 14 and the junk ring 13, after which the main seal ring 15 can be renewed. FIG. 4 also shows the same valve disc at 10', after the removal of the spindle 11, being removed from the body through the inspection aperture. The seat ring 4 is shown being removed through the same aperture for renewal or examination.

I claim:
1. A butterfly valve comprising
   a valve body including a central body portion in the form of a channel of substantially U-shaped cross-section having a top opening and tubular fluid flow inlet and outlet connections opening into the ends of said channel,
   a seat ring located in a working position in the lower part of said channel adjacent the outlet connection and arranged so as to be removable from said working position through said top opening,
   a removable cover detachably secured over the top opening of the central body portion,
   retaining means fixedly connected to and positioned adjacent the underside of said cover for holding the seat ring in its working position while the cover is secured over said top opening,
   a spindle journalled in bearings in the side walls of the central body portion and located so that its central axis intersects the centre-line of the curved lower part of the channel of said central body portion and lies in a plane parallel to, and offset in the direction towards the inlet connection from, the plane of the seat ring, and
   a valve disc detachably mounted on said spindle in offset relation thereto and rotatable with said spindle between a valve-closing position in which its periphery is sealed with respect to the seat ring and a valve-opening position in which its periphery is removed from the seat ring.

2. A butterfly valve as claimed in claim 1, wherein the seat ring has a sealing surface of part-spherical shape having its centre coincident with the point of intersection of the axis of the valve disc spindle and the centre line of the curved lower part of the channel of the central body portion, and the valve disc has a resilient sealing ring fitted around its periphery and arranged to cooperate with said sealing surface in the valve-closing position of the valve disc.

3. A butterfly valve as claimed in claim 2, wherein the ring seat is slidably engaged in a U-shaped groove formed in the interior wall surface of the central body portion adjacent the outlet connection, and the retaining means comprises a saddle plate projecting downwardly from the underside of the cover, having its lateral edge portions slidably engaged in the upper parts of the two upright limbs of the U-shaped groove and engaging over the upper peripheral portion of the seat ring.

4. A butterfly valve as claimed in claim 3, wherein the seat ring is rotatable in its working position and has a ring of gear teeth on its periphery meshing with a driving gear on a shaft rotatably supported by the valve body.

5. A butterfly valve as claimed in claim 4, wherein the driving gear is a worm gear.

6. A butterfly valve as claimed in claim 1, wherein a sealing ring is accommodated in an annular groove having one sidewall defined by the upstream side of the valve disc when the valve disc is in the closed position, the groove having a base wall which is an integral part of the valve disc, and the other sidewall of the groove being formed by a junk ring removably secured to the valve disc.

7. A butterfly valve as claimed in claim 6, wherein the annular groove is of dovetail cross-section.

8. A butterfly valve as claimed in claim 7, wherein the junk ring is formed with a ring of pressure-relief holes opening into the base part of the annular groove.

References Cited

UNITED STATES PATENTS

| | | | |
|---|---|---|---|
| 824,166 | 6/1906 | Aiken | 251—305 X |
| 2,414,751 | 1/1947 | Ludeman. | |
| 2,853,266 | 9/1958 | Raleigh | 251—104 X |
| 2,902,254 | 9/1959 | Conway et al. | 251—305 |
| 2,936,778 | 5/1960 | Stillwagon | 251—306 X |
| 3,078,070 | 2/1963 | Cooper | 251—306 |
| 3,134,271 | 5/1964 | Ray | 251—68 X |
| 1,770,900 | 7/1930 | Dawson. | |
| 2,713,989 | 7/1955 | Bryant | |
| 2,853,267 | 9/1958 | Herren et al. | 251—307 XR |
| 3,081,791 | 3/1963 | Wheatley | 251—306 XR |
| 3,156,445 | 11/1964 | Swain | 251—307 XR |
| 3,157,190 | 11/1964 | Allen | 137—330 |

FOREIGN PATENTS

| | | |
|---|---|---|
| 247,170 | 10/1960 | Australia. |
| 952,445 | 3/1964 | Great Britain. |

HENRY T. KLINKSIEK, Primary Examiner

U.S. Cl. X.R.

251—173, 249.5